Figure 2:
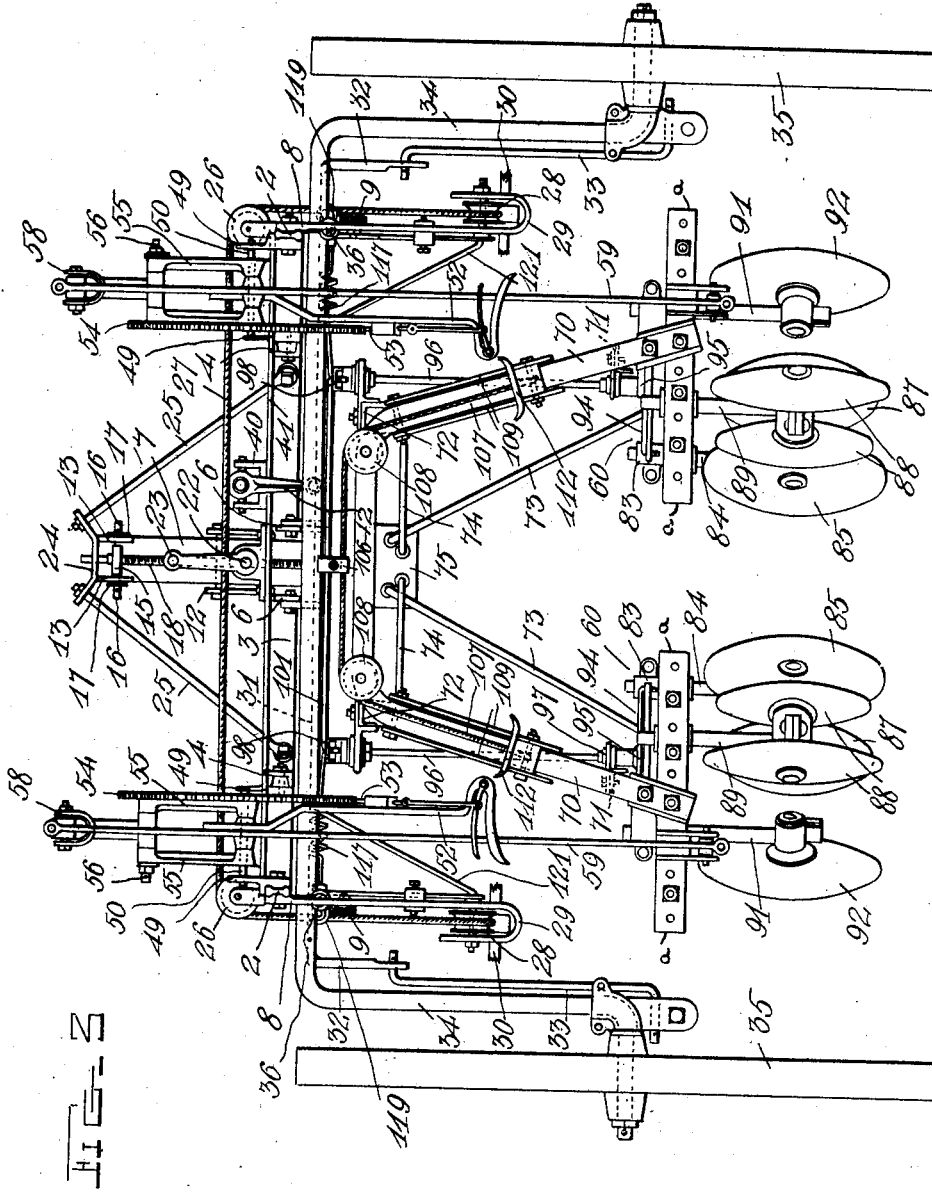

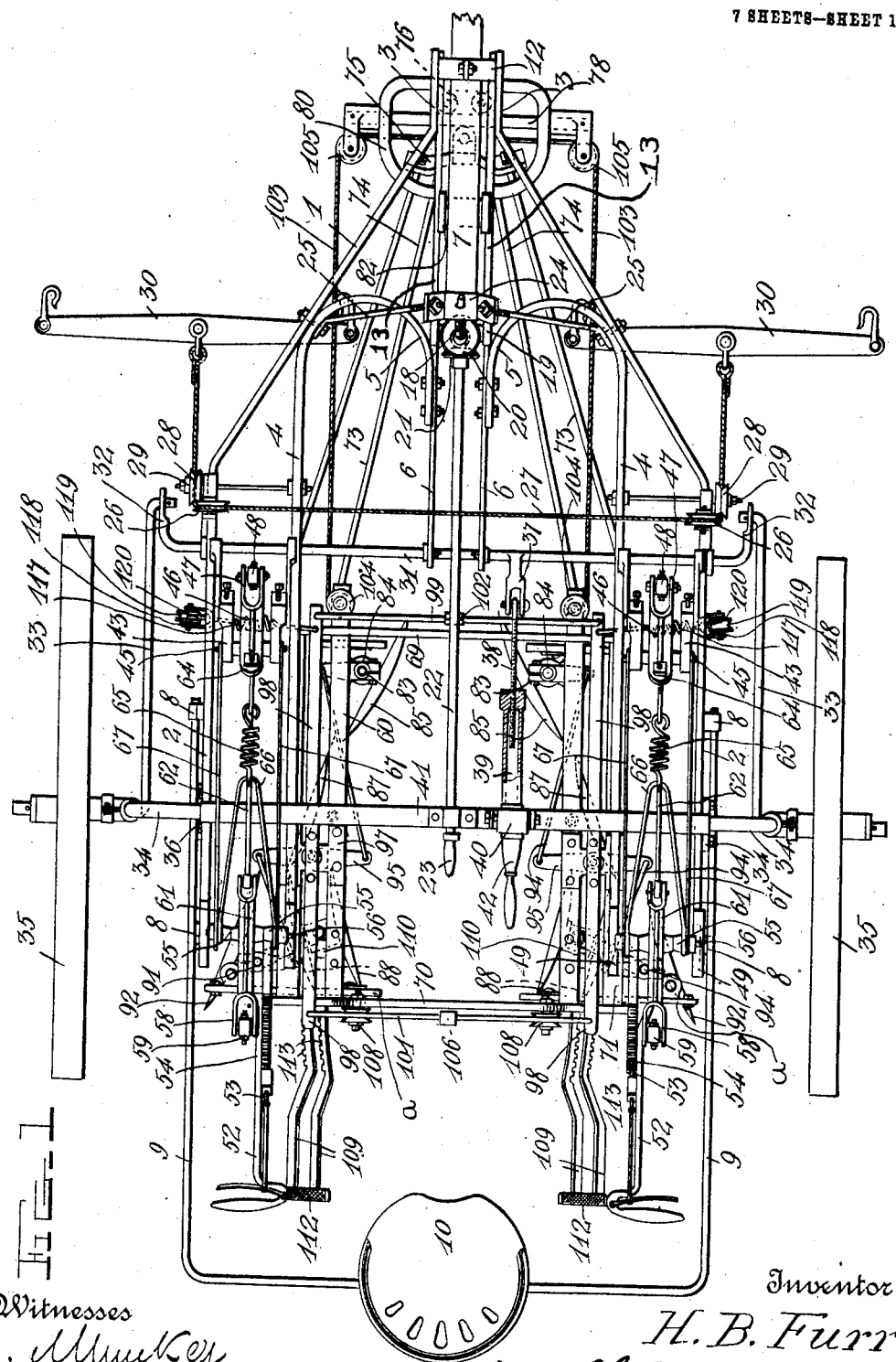

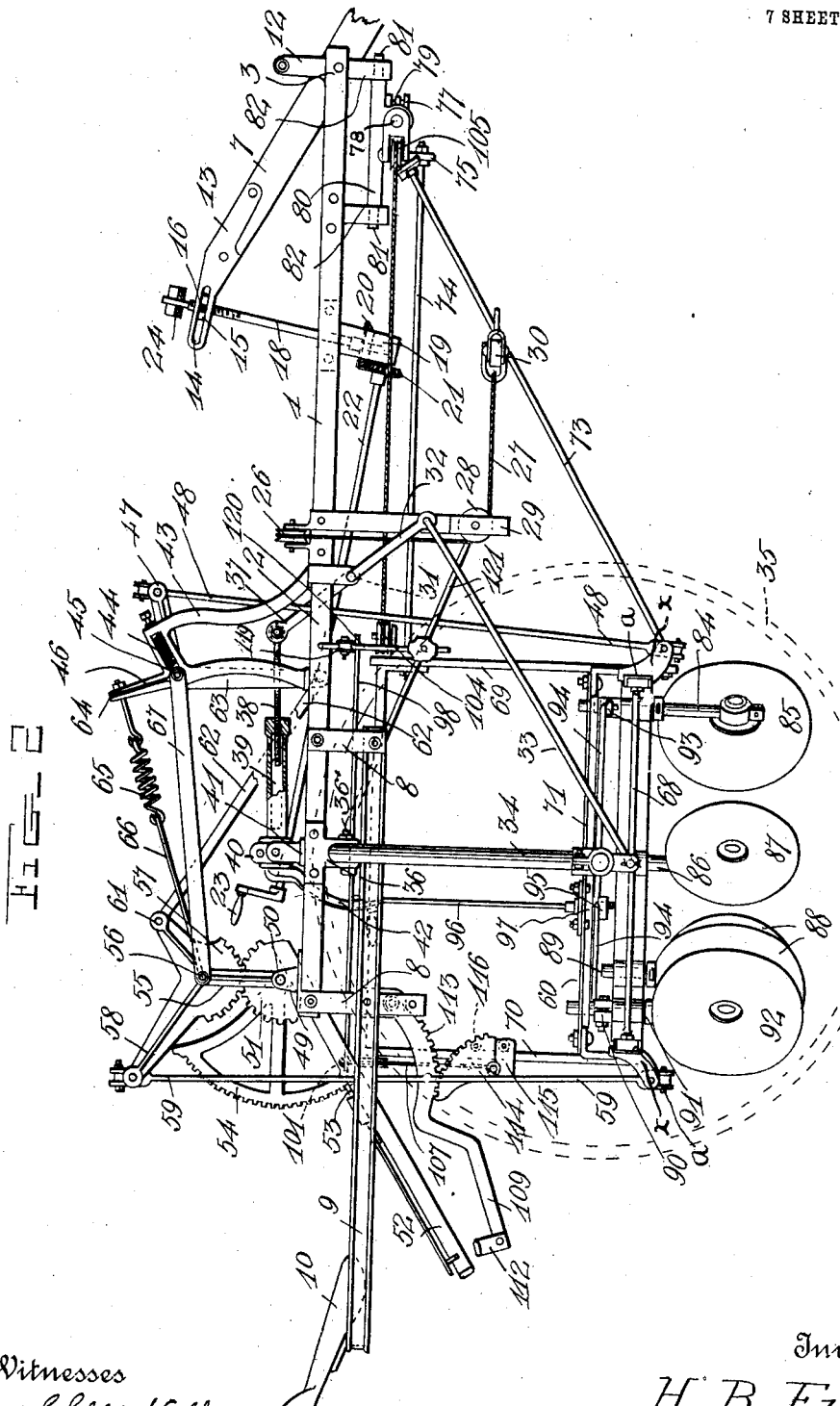

No. 826,418.

PATENTED JULY 17, 1906.

H. B. FURR.
ROLLING DISK CULTIVATOR.
APPLICATION FILED DEC. 14, 1905.

7 SHEETS—SHEET 3.

Witnesses

Inventor
H. B. Furr
by H. B. Wilson
Attorney

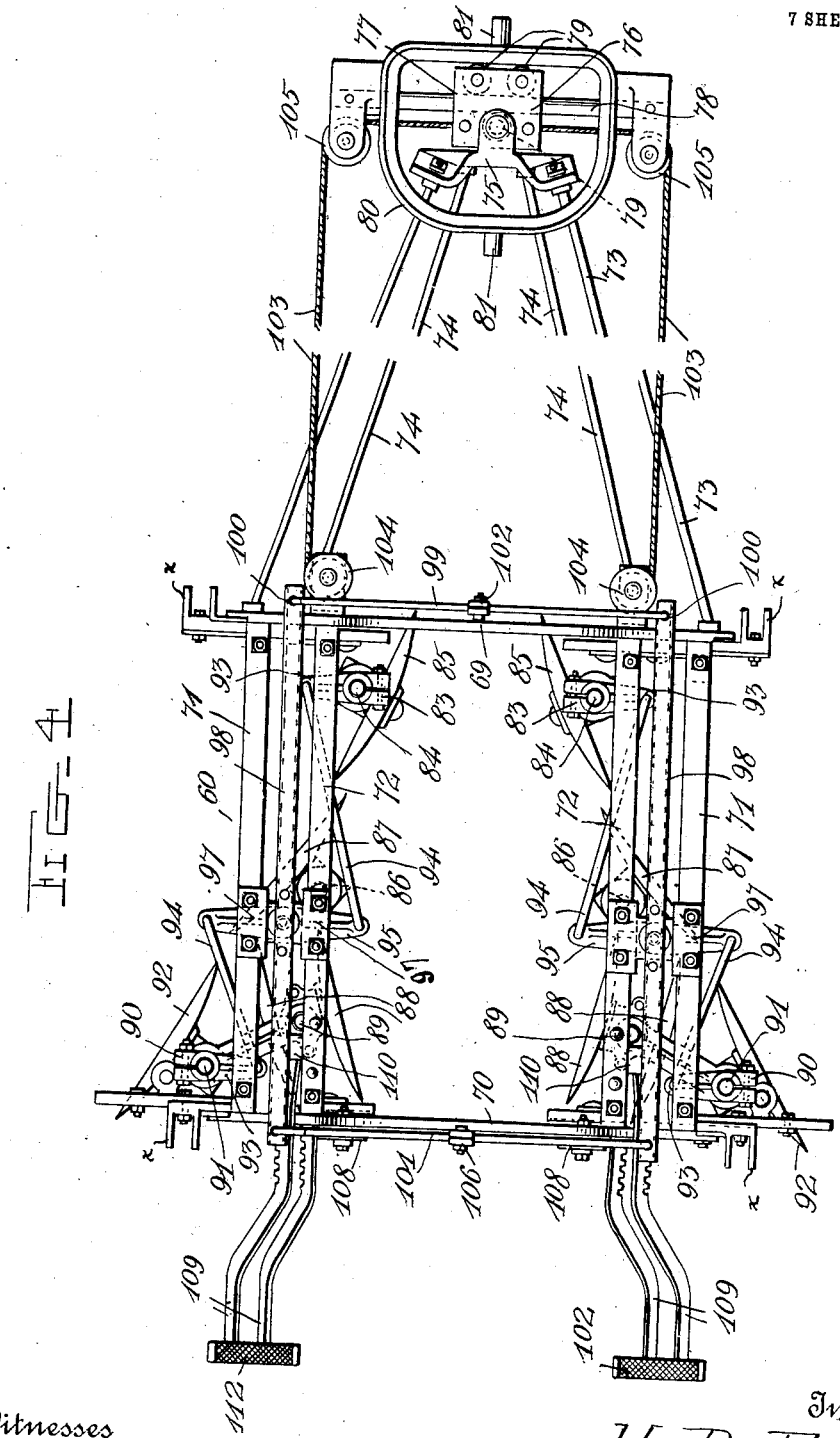

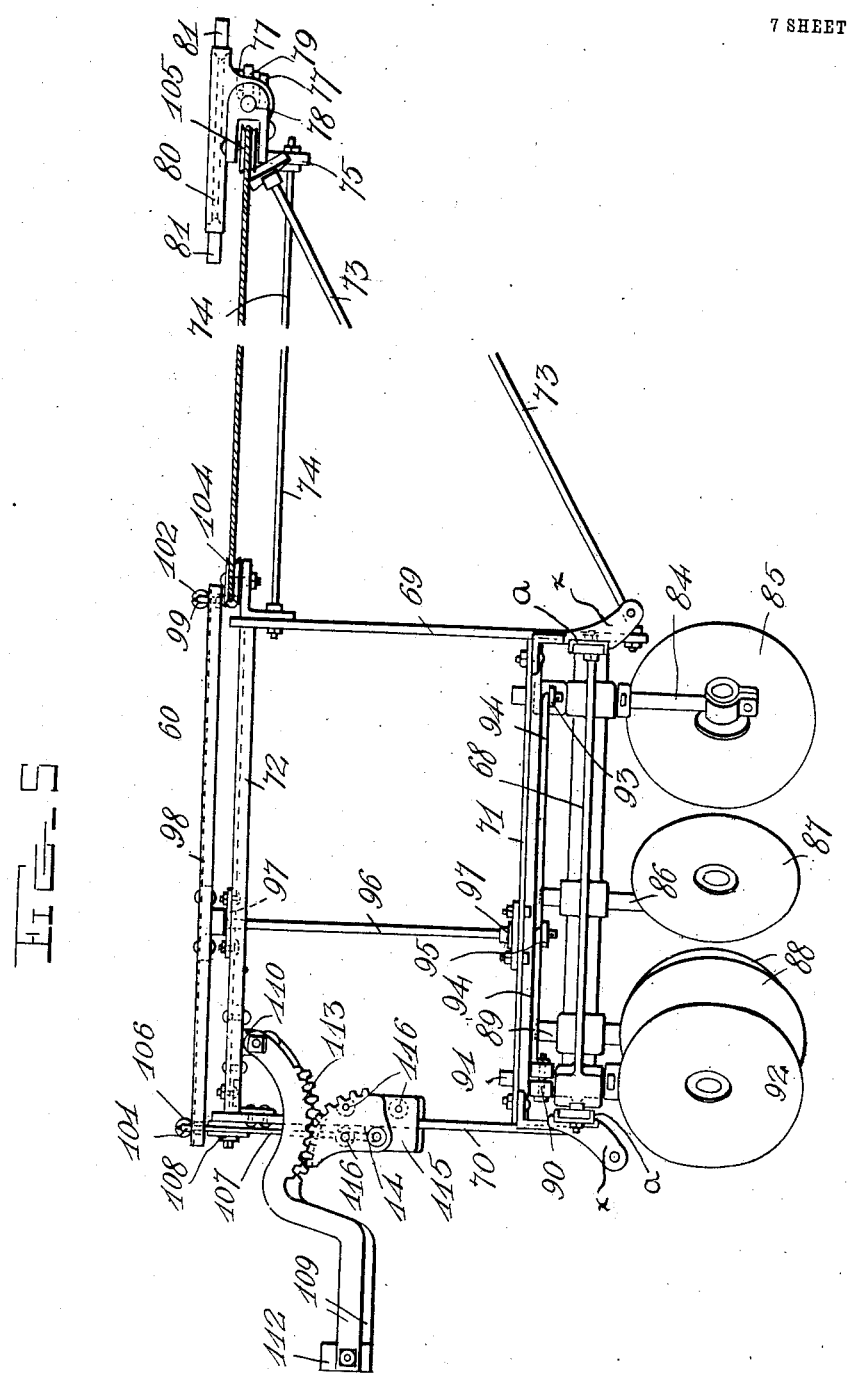

No. 826,418. PATENTED JULY 17, 1906.
H. B. FURR.
ROLLING DISK CULTIVATOR.
APPLICATION FILED DEC. 14, 1905.
7 SHEETS—SHEET 6.
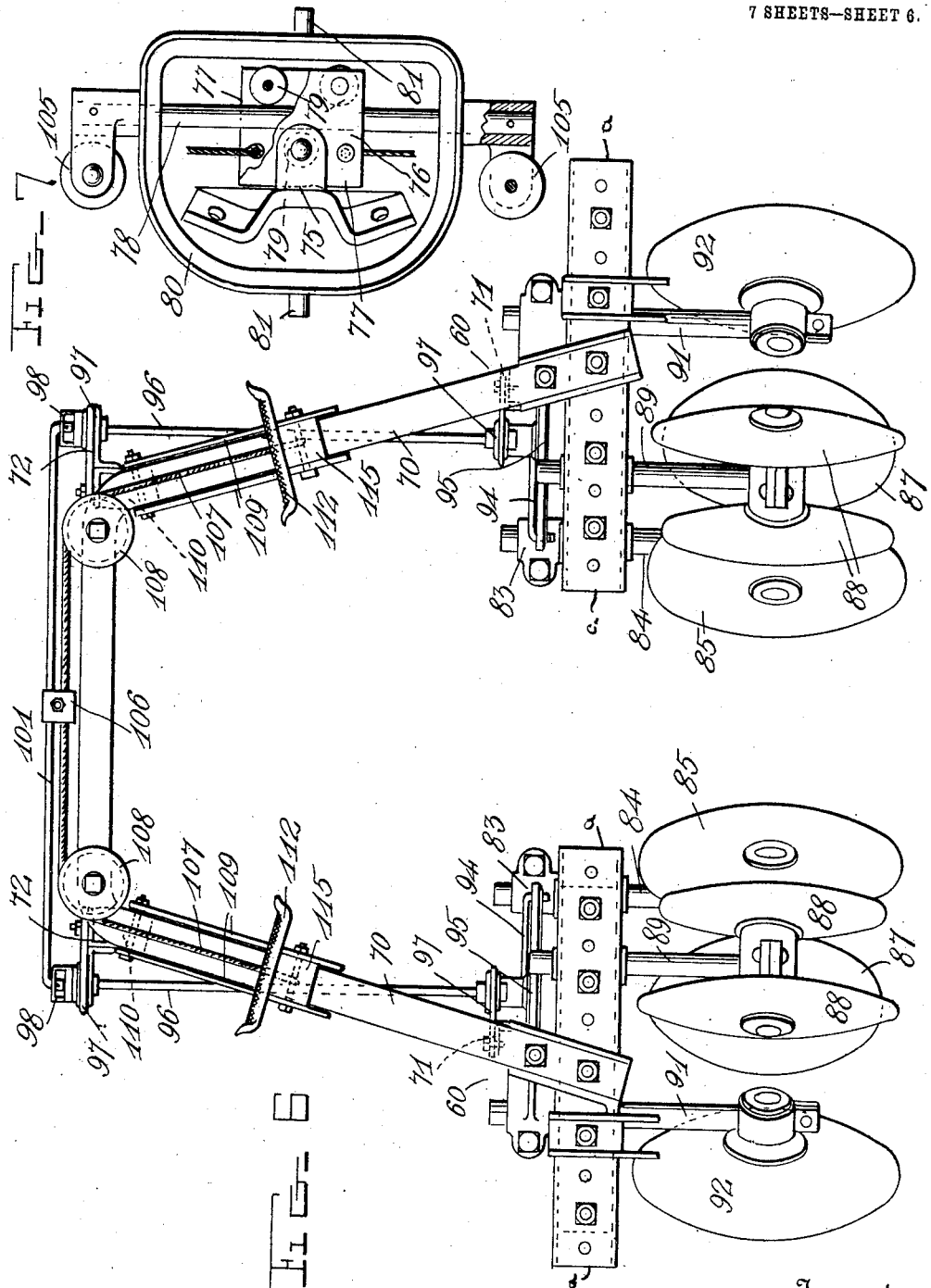
Witnesses
Inventor
H. B. Furr
by H. R. Wilson
Attorney

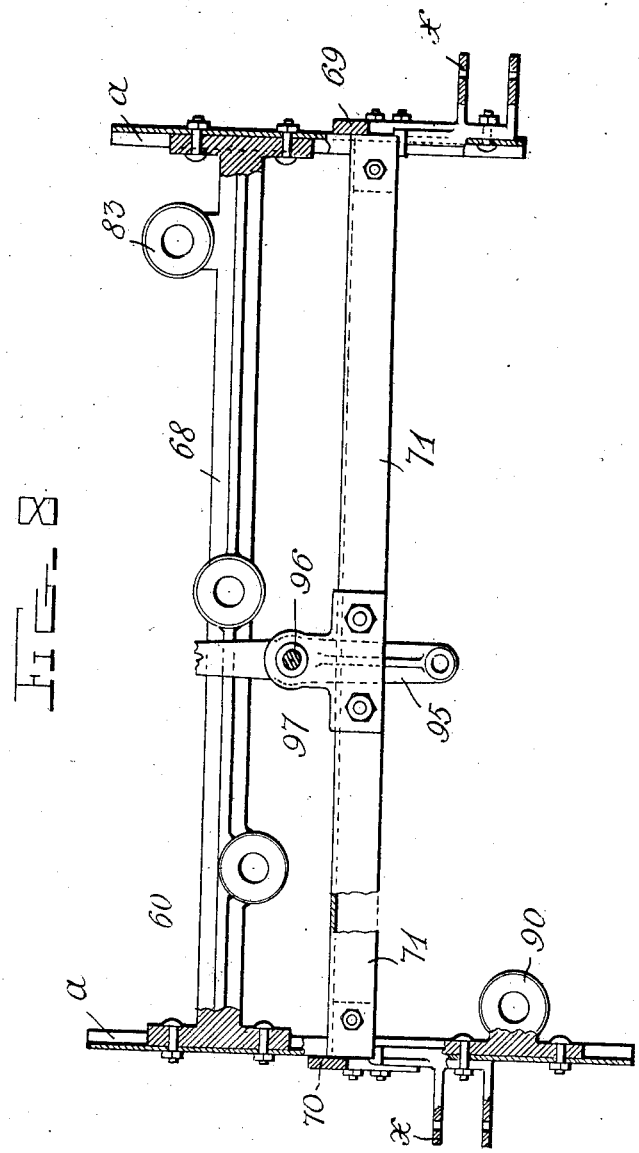

UNITED STATES PATENT OFFICE.

HENRY B. FURR, OF DAYTON, ILLINOIS.

ROLLING-DISK CULTIVATOR.

No. 826,418.

Specification of Letters Patent.

Patented July 17, 1906.

Application filed December 14, 1905. Serial No. 291,775.

*To all whom it may concern:*

Be it known that I, HENRY B. FURR, a citizen of the United States, residing at Dayton, in the county of Lasalle and State of Illinois, have invented certain new and useful Improvements in Rolling-Disk Cultivators; and I do declare the following to be a full, clear, and exact description of the invention, such as will enable others skilled in the art to which it appertains to make and use the same.

This invention relates to improvements in rolling-disk cultivators.

The object of the invention is to provide a cultivator by means of which dry clods of dirt, weeds, and other rubbish on top of the ground may be thrown away from the growing plants and fresh dirt thrown onto the latter without danger of plowing up or injuring any of the plants.

Another object is to provide a machine of this character having means whereby the frame carrying the cultivator-disks may be raised or lowered, means for shifting the same laterally, and means whereby the forward end of the machine may be adjusted to throw the forward cultivator-disk downwardly, thereby causing said disk to plow deeper than the disk on the rear portion of the machine.

A further object is to provide means where, by the position of the supporting-wheels may be varied to change the balance and the neck-draft of the machine.

With the above and other objects in view the invention consists of certain novel features of construction, combination, and arrangement of parts, as will be hereinafter described and claimed.

In the accompanying drawings, Figure 1 is a plan view of a cultivator constructed in accordance with the invention. Fig. 2 is a side view of the same with the supporting-wheels shown in dotted outline. Fig. 3 is a rear end elevation. Fig. 4 is a plan view of the auxiliary or floating frame on a larger scale and removed from the main supporting-frame. Fig. 5 is a side view of the parts shown in Fig. 4. Fig. 6 is a rear end elevation of the same. Fig. 7 is a plan view, partly in section, of the yoke or frame journaled on the under side and at the forward ends of the tongue-supporting plates; and Fig. 8 is a detail plan view of one side of the auxiliary frame, parts being broken away to better illustrate the construction.

Referring more particularly to the drawings, 1 denotes the supporting-frame, consisting of parallel horizontally-disposed outer side bars 2, the forward ends of which are bent inwardly or converge to form a tongue-support, as shown at 3. Arranged within the side bars 2 are inner longitudinally-disposed bars 4, which run parallel with the bars 2 and are spaced at suitable distances therefrom. The forward ends of said bars 4 are bent inwardly and rearwardly, as shown at 5, and bolted or otherwise secured to the inwardly-bent ends 5 of the bars 4, and to the forward converging ends of the side bars 2 is a pair of longitudinally-disposed bars 6, between which the inner end of the tongue 7 is pivoted. Bolted to the rear portion of the side bars 2 are downwardly-projecting brackets 8, to which are secured the forward ends of a rectangularly-shaped seat-supporting frame 9, on the rear cross-bar of which is secured the driver's seat 10.

Around the tongue 7, where the same is pivotally connected to the ends of the side bars 2 is a yoke 12, and to the rear end of the tongue is secured a pair of rearwardly-projecting parallel plates 13, in which are formed longitudinally-disposed slots 14. Between the plates 13 is arranged a nut 15, on the opposite sides of which are formed laterally-projecting studs 16, adapted to slidably engage the slots 14 in said plates. The studs 16 project slightly beyond the outer sides of the plates 13, and on the same are arranged washers 17, held in place by means of cotter-pins or similar fastening devices. By means of the washers 17 the nut 15 is held in sliding engagement with the slotted plates 13, as will be understood. Working through the nut 15 is a threaded rod 18, the lower end of which is journaled in a suitable bracket 19, secured between the bars 6, as shown. On the lower end of the threaded rod 18 is mounted a beveled gear-pinion 20, with which is adapted to mesh a similar pinion 21, mounted on the forward end of a longitudinally-disposed shaft 22, which is journaled in suitable bearings on the frame 1. Secured to the inner end of the shaft 22 is a crank-handle 23, by means of which the latter and the beveled gear-pinion 21 is turned, thereby turning the gear 20 and the threaded rod 18, which will cause the nut 15 to work up or down thereon to raise or lower the rear end of the tongue. The upper end of the threaded rod 18 is pivoted in a plate 24, the ends of which are bent upwardly at a slight angle and are connected to the upper ends of inclined brace-rods 25, the lower ends of which are secured to the inner side bars 4 of the frame 1.

Journaled in brackets secured to the outer side bar 2 are guide-rollers 26, over which pass a draft chain or cable 27, which after passing over said guide-rollers 26 passes downwardly and around the guide-rollers 28, journaled in bracket bars or plates 29, the upper ends of which are secured to the bars 2 of the main frame. The ends of the chain or cable 27 after passing around the guide-rollers 28 are adapted to project forwardly and have secured thereto swingletrees 30, by means of which the draft-animals are hitched to the machine.

Journaled in suitable brackets secured to and projecting downwardly from the side bars of the main frame is a horizontal transversely-disposed crank-shaft 31. The outer ends of this shaft 31 are bent downwardly to form crank-arms 32, to the lower ends of which are connected the forward ends of inclined link rods 33. The lower rear ends of these rods 33 are pivotally connected to the lower ends or spindles of an arched axle 34, on said spindles of which are journaled supporting-wheels 35. The upper cross-bar of the axle 34 has a pivotal engagement with the side bars 2 of the main frame by means of bearing-brackets 36, which are bolted or otherwise secured to said side bars and project downwardly therefrom, the axles 34 being held in said bearings by means of bolts 36'. Arranged on the crank-shaft 31 is an upwardly-projecting crank-arm 37, to the upper end of which is pivotally connected the forward end of a threaded rod 38. The rear end of the latter is adapted to be screwed into a threaded sleeve or socket 39, the inner end of which is revolubly mounted and pivoted in a bracket 40, secured to the transversely-disposed bar 41. The ends of the bar 41 are supported upon and secured to the longitudinal bars of the main frame, as shown. To the inner end of the threaded sleeve 39 is secured a crank-arm 42, by means of which said sleeve is turned in one direction or the other, thereby screwing the same off of or onto the threaded rod 38, which operation will draw the rod 38 forwardly or rearwardly, thus rocking the crank-shaft 31, which, through the downwardly-projecting crank-arms 32 and the link rods 33, will rock the arched axle 34 in the bearing-brackets 36 on the main frame, thereby shifting the supporting-wheels backwardly or forwardly under the machine and varying the balance and reducing the weight upon the neck of the draft-animals.

Mounted on the bars 2 and 4 on each side of the machine immediately in rear of the crank-shaft 31 are pairs of upwardly-projecting standards 43, in each pair of which are formed alined obliquely-disposed slots 44, in which is slidably mounted a shaft 45. Pivotally mounted on the shaft 45 are three-armed levers 46. To the forward upwardly-projecting arm 47 of said levers is loosely connected, by means of a universal joint, the upper ends of two depending supporting bars or rods 48.

On the outer ends of the bars 2 and 4 at each side of the machine are secured upwardly-projecting bearing-brackets 49, in which is journaled a shaft 50. On the shaft 50 is pivotally mounted a segmental gear 51, to which is connected a hand-lever 52, said levers being adapted to work up and down between the rear ends of the bars 2 and 4, as shown. The levers 52 are provided with spring-projected bars 53, which are adapted to engage the teeth of segmental racks 54, secured to the outer ends of the bars 4, as shown. On the shafts 50 are pivotally mounted pairs of upwardly-projecting bars 55, in the upper end of each pair of which is arranged a shaft 56, on which are journaled segmental gears 57. The teeth of the latter are adapted to mesh with the teeth of the segmental gears 51 on the shafts 50. On the gears 57 are formed rearwardly and upwardly projecting arms 58, to the outer ends of which are pivotally connected by a universal joint depending supporting-rods 59, which, together with the forward supporting-rods 48, are adapted to support an auxiliary or floating frame 60, the construction of which will be hereinafter described. The gears 57 have also formed thereon forwardly and upwardly projecting arms 61, to the ends of which are pivotally secured inclined connecting-rods 62. The lower forward ends of these rods 62 are pivotally connected to the lower ends of the downwardly-projecting arms 63 of the three-armed lever 46, journaled at the forward ends of the machine, as hereinbefore described. By thus arranging the operating levers and gears which support the floating frame 60 the front and rear ends of the latter may be simultaneously raised or lowered by raising or lowering the hand-levers 52. In order to facilitate the raising of the frame 60, the levers 46 are provided with upwardly-projecting arms 64, to which are connected coil-springs 65, the opposite ends of which are connected to a yoke-rod 66, the ends of which are secured to the shafts 56, as shown. The shafts 56 and 45 are connected together by pairs of brace rods or bars 67.

The auxiliary frames 60 each consist of a beam 68, to the front and rear ends of which are connected front and rear channel-bars $a$, to which the arches 69 and 70 are secured. The arches 69 and 70 are each connected together near their lower ends by longitudinally-disposed bars or plates 71 and at their upper ends by longitudinally-disposed connecting-bars 72. The front and rear ends of the beam 68 are provided with forwardly and rearwardly projecting brackets $x$, to which the lower ends of the supporting-rods 48 and 59 are loosely connected to raise and lower said floating frame.

Connected to the lower ends of the forward arch 69 are upwardly-projecting inclined and converging draft-rods 73, and to the upper portion of the arch 69 is connected forwardly-projecting horizontally-disposed converging brace-rods 74. The forward ends of said draft-rods 73 and brace-rods 74 are connected to a clevis 75, which is pivotally connected to a sliding carriage 76, consisting of upper and lower horizontally-disposed parallel plates 77, arranged above and below a horizontal transversely-disposed guide-bar 78. Between the plates 77 are journaled guide-rollers 79, adapted to engage each side of the guide-bar 78, thus permitting said carriage 76 to travel freely back and forth across the guide rod or bar 78. The guide bar or rod 78 is secured to an open frame or yoke 80, provided at its front and rear sides with longitudinally-projecting studs 81, which are journaled in bearing-brackets 82, secured to and depending from the lower side of the parallel bars 6, to which the tongue 7 is pivoted and by means of which the floating frame 60 is pivotally connected to and permitted to turn sidewise beneath the supporting-frame.

On the inner side of the beams 68 adjacent to their forward ends are secured inwardly-projecting vertically-disposed bearing-brackets 83, in each of which is journaled the upwardly-projecting stem or standard 84 of a forward cultivator-disk 85, said disk being revolubly mounted on the lower ends of the standards 84, as shown. On each of the beams 68 in rear of the disk 85 are rigidly connected the standards 86 of rolling or revolving disks 87. In the beams 68 in rear of the disk 87 are arranged a pair of disks 88, journaled on the lower end of a stem or standard 89, also rigidly mounted in the beams. On the outer ends of the rear bars $a$ $a$ are mounted bearing-brackets 90, in which are revolubly mounted the standards 91 of rear cultivating-disks 92, said disks being revolubly mounted on the lower ends of said standards. Fixedly mounted on the upwardly-projecting stems or standards of the disks 85 and 92 are inwardly-projecting crank-arms 93. The latter are connected at their inner ends by means of links 94 to the opposite ends of a cross-head 95, which is fixedly mounted upon the lower end of a vertically-disposed operating-rod 96, journaled in brackets 97, projecting from the upper and lower connecting-bars 71 and 72 of the arches 69 and 70 on the front and rear ends of the beam.

Fixedly mounted on the upper ends of the rods 96 are longitudinally-disposed levers 98, which extend from front to rear on each side of the machine. The front ends of the levers 98 are loosely connected together by a cross bar or rod 99, the opposite ends of which are bent downwardly and engage apertures 100, formed in the forward ends of said levers 98. The levers 98 are connected at their rear ends by a cross rod or bar 101, the ends of which are similarly engaged with the ends of the levers. The cross-rod 99 at the forward end of the machine is provided with a centrally-disposed downwardly-projecting clamp 102, by means of which said rod is connected with a chain or cable 103, which passes around guide-pulleys 104, journaled on brackets secured to the front arch 69 of the frame. The chain or cable 103 passes forwardly from the guide rollers or pulleys 104 and around similar pulleys 105, journaled in brackets secured to the opposite ends of the guide-bar 78, upon which slides the carriage 76. The ends of the chain or cable after passing around the pulleys 105 are connected to said carriage 76 between the plates 77, as shown.

The cross-rod 101, connecting the rear ends of the levers 98, is provided with a centrally-disposed downwardly-projecting clamp 106, by means of which said rod is connected to a chain or cable 107, which passes over guide-pulleys 108, journaled on the rear side of a rear arch 70 of the floating frame, as shown. The ends of the chain or cable 107 after passing over the pulleys 108 are connected to foot-levers 109, arranged on each side of and projecting rearwardly from the floating frame in position to be engaged by the feet of the driver or operator from the seat 10. Each of the levers 109 consists of a pair of bars or plates formed in the shape of a compound curve and connected at their upper inner ends to a downwardly-projecting bracket 110, secured to and projecting downwardly from the upper connecting-bars 72 of the floating frame. The bars or plates forming the foot-levers project on each side of the downwardly-inclined ends of the rear arch of the frame 60 and are connected together at their outer ends by a treadle or foot-rest 112. The lower sides of the inner portions of the plates forming the levers 109 are provided with segmental racks 113, the teeth of which are adapted to engage the teeth of eccentrically-mounted segmental plates 114, which are pivotally mounted on each side of carriages 115, said carriages being slidably mounted on the downwardly-inclined portions of the rear arches 70, as shown. Each of the carriages 115 preferably consists of a pair of plates, one of which is disposed on each side of said portion of the arch 70, the plates being bolted or otherwise secured together and having journaled between them the guide-rollers 116, adapted to bear on or engage the opposite sides of the arch, as shown.

When it is desired to shift the auxiliary or floating frame 60 to the right or left, one or the other of the levers 109 is depressed, thereby pushing the carriage engaged thereby downwardly, which will raise the carriage on the opposite side of the frame through the medium of the chain or cable 107, which by reason of its connection with the cross-rod 101 will swing the levers 98, thereby shifting the cross-rod 99, connected to the opposite ends of the levers and secured to the clamp 102, connecting said rod to the chain or cable 103, and will draw said chain or cable in one direction or the other, thus shifting the carriage 76 across the guide-bar 78 and moving the auxiliary frame in the desired direction. The swinging of the levers 98 will turn the shafts or operating-rods 96 and the cross-heads 95, secured to the lower ends thereof, thus drawing upon the link rods 94, connecting the opposite ends of said cross-head with the crank-arms 93 on the standards of the disk 85 and 93, causing the latter to be turned in the proper direction to assist in the shifting of the floating frame when engaged with the ground. In other words, the disks on the side from which the frame is being shifted will be turned to engage more soil, while those on the opposite side will be turned to engage less soil, thereby facilitating the movement of the frame. It will be understood that the foot-levers 109 are used in the manner just described for shifting the floating frame bodily. When, however, it is desired to shift simply the rear end of the frame, said end is pushed over in the direction desired, the forward end of the frame swinging or turning upon the pivot of the clevis 75, which is pivoted to the carriage 76, as hereinbefore described.

Connected to the forward ends of the levers 98 are coil-springs 117, the opposite ends of which are connected to clips 118, in which are journaled guide-rollers 119. The rollers 119 are engaged with and slide on vertically-disposed guide-rods 120, the upper ends of which are secured to the side bars 2 of the main frame and the lower ends of which are connected to brace-rods 121, which connect the lower ends of the bearing-brackets 29 with the bearing-brackets 36, in which the supporting-axle of the main frame is journaled. The springs 117 assist in the movement of the floating frame and also serve to maintain the forward end of said frame in proper position.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. In a rolling-disk cultivator, the combination with a main supporting-frame, of an auxiliary or floating frame loosely connected to said main frame, cultivating-disks carried by said floating frame, means to raise and lower and to swing said frame, and means whereby when said floating frame is swung said disks will be automatically turned, substantially as described.

2. In a rolling-disk cultivator, the combination with the supporting-wheels of an arched axle journaled therein, a main supporting-frame pivotally mounted on said axle, means to rock said axle and thereby throw said supporting-wheels backward or forward, an auxiliary or floating frame loosely connected to said main frame, levers to simultaneously raise and lower the front and rear end of said floating frame and to support the same in elevated position, means to swing said floating frame, in one direction or the other, a tongue pivotally mounted in the forward end of said main frame, means to raise and lower the rear end of said tongue, rolling cultivating-disks carried by said floating frame, and means to turn certain of said disks, substantially as described.

3. In a rolling-disk cultivator, the combination with a main supporting-frame, of an arched axle pivotally connected to the lower side of said frame, a crank-shaft journaled on said frame, link rods connecting said crank-shaft with said arched axle, an upwardly-projecting crank-arm connected to said crank-shaft, a threaded rod connected to said crank-arm, a threaded sleeve revolubly and pivotally mounted on said supporting-frame, a crank-handle connected to said sleeve to turn the same and thereby project or retract said threaded rod, turn said crank-shaft and throw the supporting-wheels backward or forward under said frame, an auxiliary or floating frame supported below and by said main frame, cultivating-disks carried by said floating frame, and means whereby the latter is raised or lowered, substantially as described.

4. In a rolling-disk cultivator, the combination with a wheeled main supporting-frame, of an auxiliary or floating frame arranged below said main frame, cultivating-disks carried by said floating frame, bearing-brackets arranged on the forward portion of said main frame, a three-armed lever pivotally and slidably mounted in said brackets, front supporting-rods having at their upper ends a universal-joint connection with one of the arms of said lever and at their lower ends a similar connection with the forward end of said floating frame, lifting-levers pivotally mounted on the rear end of said supporting-frame, a segmental gear arranged on the inner end of said levers, pivotally-mounted bearing bars or links, segmental gears journaled in said bars or links, forwardly and rearwardly projecting lever-arms arranged on said gears, rear supporting-rods having at their upper ends universal-joint connections with said rearwardly-projecting lever-arms and at their lower ends a similar connection with the rear end of said floating frame, a rod to connect the forward lever-arm on said gear with the lower arm of said three-armed lever, and brace-rods to connect said bearing links or bars with the sliding pivot of said three-armed lever, substantially as described.

5. In a rolling-disk cultivator, the combination with a wheeled, supporting-frame, of a floating frame loosely connected to and supported by said wheeled frame, cultivating-disks carried by said floating frame, means to raise and lower the latter and said disks, draft-rods connected to the forward end of said floating frame, a pivoted sliding connection between the opposite end of said draft-rods and the forward end of said wheeled frame, means to shift said floating frame to one side or the other, an equalizing draft mechanism connected with said wheeled frame, a tongue pivotally connected with the forward end of the latter, and means to raise and lower the rear end of said tongue, substantially as described.

6. In a rolling-disk cultivator, the combination with a wheeled, supporting-frame, of a floating frame loosely connected to and supported by said wheeled frame, cultivating-disks carried by said floating frame, means to raise and lower the latter and said disks, draft-rods connected to the forward end of said floating frame, a yoke-frame pivotally connected to the lower side of the forward end of said wheeled frame, a guide-bar arranged on said yoke-frame, a carriage slidably mounted on said guide-bar, a clevis to pivotally connect the forward ends of said draft-rods with said carriage, means to shift said carriage on said guide-rod and thereby move said floating frame to one side or the other, an equalizing draft mechanism connected to said wheeled frame, a pivoted tongue and means to raise and lower the rear end of the latter, substantially as described.

7. In a rolling-disk cultivator, the combination with a wheeled, supporting-frame, of a floating frame loosely connected to and supported by said wheeled frame, cultivating-disks carried by said floating frame, means to raise and lower the latter and said disks, draft-rods connected to the forward end of said floating frame, a yoke-frame pivotally connected to the lower side of the forward end of said wheeled frame, a guide-bar arranged on said yoke-frame, a carriage slidably mounted on said guide-bar, a clevis to pivotally connect the forward ends of said draft-rods with said carriage, a chain or cable having its ends connected to said carriage, guide-pulleys to support and guide said chain or cable, shifting-levers pivotally mounted on said floating frame, rods connecting the front and rear ends of said shifting-levers, means to connect the rod on the forward end of said levers to said chain or cable, foot-levers pivotally mounted on the rear end of said floating frame, carriages slidably mounted on the same, means whereby said carriages are engaged by said foot-levers to shift said frame, a chain or cable connecting said carriages, guide-pulleys to support said chain or cable, and means to connect the rod on the rear end of said levers with said chain or cable, substantially as described.

8. In a rolling-disk cultivator, the combination with a wheeled, supporting-frame, of a floating frame loosely connected to and supported by said wheeled frame, cultivating-disks carried by said floating frame, means to raise and lower the latter and said disks, draft-rods connected to the forward end of said floating frame, a yoke-frame pivotally connected to the lower side of the forward end of said wheeled frame, a guide-bar arranged on said yoke-frame, a carriage slidably mounted on said guide-bar, a clevis to pivotally connect the forward ends of said draft-rods with said carriage, a chain or cable having its ends connected to said carriage, guide-pulleys to support said chain or cable, vertically-disposed operating rods or shafts journaled in said floating frame, a cross-head secured to the lower end of the same, crank-arms fixed on the standards of the front and rear cultivating-disks on each side of said floating frame, links to connect said crank-arms with the ends of said cross-heads, shifting-levers fixedly mounted on the upper ends of said operating rods or shafts, rods connecting the front and rear ends of said shifting-levers, means to connect the rod on the forward end of said levers to said chain or cable, foot-levers pivotally mounted on the rear end of said floating frame, carriages slidably mounted on the same, means whereby said carriages are engaged by said foot-levers to shift said frame, a chain or cable connecting said carriages, guide-pulleys to support said chain or cable, and means to connect the rod on the rear end of said levers with said chain or cable, substantially as described.

9. In a rolling-disk cultivator, the combination with a wheeled, supporting-frame, of a floating frame loosely connected to and supported by said wheeled frame, cultivating-disks carried by said floating frame, means to raise and lower the latter and said disks, draft-rods connected to the forward end of said floating frame, a yoke-frame pivotally connected to the lower side of the forward end of said wheeled frame, a guide-bar arranged on said yoke-frame, a carriage slidably mounted on said guide-bar, a clevis to pivotally connect the forward ends of said draft-rods with said carriage, means to shift said carriage on said guide-rod and thereby move said floating frame to one side or the other, an equalizing draft mechanism connected to said wheeled frame, a tongue pivotally mounted in the forward end of the same, slotted plates secured to and projecting beyond the inner end of said tongue, a nut pivotally and slidably mounted in said plates, a threaded rod journaled in said wheeled frame to engage said nut, a beveled pinion fixed on the lower end of said rod, a longitudinally-disposed operating-shaft, a beveled gear fixed on one end of the same to engage the beveled gear on said threaded rod, and a crank-handle fixed on the opposite end of said shaft, substantially as described.

10. In a rolling-disk cultivator, the combination with a wheeled supporting-frame having pivotally connected thereto an arched axle, of means to rock said axle thereby throwing said wheels forward or backward, an auxiliary or floating frame arranged beneath and loosely connected to said wheeled frame, said floating frame consisting of a pair of longitudinally-disposed beams, front and rear arched frames to connect the front and rear ends of said beams, front and rear pairs of supporting-rods loosely connected at their lower ends to said floating frame and at their upper ends to said wheeled frame, means to raise and lower said floating frame, draft and brace rods to connect the latter with said wheeled frame, a shifting mechanism to move said floating frame from side to side, fixed and rotary cultivator-standards mounted on said beams, rolling cultivator-disks journaled on said standards, and means whereby said rotary cultivator-standards are automatically turned in said beams by the operation of the shifting mechanism of said floating frame, substantially as described.

In testimony whereof I have hereunto set my hand in presence of two subscribing witnesses.

HENRY B. FURR.

Witnesses:
DANIEL MASON,
M. N. ARMSTRONG.